United States Patent
Zhang (10) Patent No.: US 10,657,330 B2
(45) Date of Patent: May 19, 2020

(54) INFORMATION EXTRACTION METHOD AND APPARATUS

(71) Applicant: BOE TECHNOLOGY GROUP CO., LTD., Beijing (CN)

(72) Inventor: Zhenzhong Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 237 days.

(21) Appl. No.: 15/744,301

(22) PCT Filed: Jul. 6, 2017

(86) PCT No.: PCT/CN2017/091999
§ 371 (c)(1),
(2) Date: Jan. 12, 2018

(87) PCT Pub. No.: WO2018/076774
PCT Pub. Date: May 3, 2018

(65) Prior Publication Data
US 2019/0005026 A1    Jan. 3, 2019

(30) Foreign Application Priority Data

Oct. 28, 2016    (CN) .......................... 2016 1 0972874

(51) Int. Cl.
*G06F 40/30*    (2020.01)
*G06F 40/295*    (2020.01)

(52) U.S. Cl.
CPC ............ *G06F 40/30* (2020.01); *G06F 40/295* (2020.01)

(58) Field of Classification Search
None
See application file for complete search history.

(56) References Cited

U.S. PATENT DOCUMENTS 6,356,864 B1 * 3/2002 Foltz ...................... G06F 40/30
704/1
6,510,406 B1 * 1/2003 Marchisio ............. G06F 40/268
704/9

(Continued)

FOREIGN PATENT DOCUMENTS

CN    1319836 A    10/2001
CN    102236692 A    11/2011

(Continued)

OTHER PUBLICATIONS

International Search Report dated Oct. 10, 2017, issued in counterpart International Application No. PCT/CN2017/091999 (12 pages).

(Continued)

*Primary Examiner* — Thuykhanh Le
(74) *Attorney, Agent, or Firm* — Westerman, Hattori, Daniels & Adrian, LLP (57) ABSTRACT

The present invention is related to an information extraction method. The information extraction method may comprise providing r semantic relationships, acquiring entity pairs corresponding to the semantic relationships, acquiring first instances based on the entity pairs, and eliminating instances that do not have the semantic relationships from the first instances to obtain second instances. r is a positive integer. Each of the entity pairs contains a pair of named entities. The first instances are sentences containing the entity pairs.

8 Claims, 8 Drawing Sheets

Provide r semantic relationships, acquire entity pairs corresponding to the semantic relationships, and acquire first instances based on the entity pairs — S10

Eliminate instances that do not have the semantic relationships from the first instances to obtain second instances — S20

Extract second features from the second instances based on the entity pairs to train a classifier — S30

Identify semantic relationships from text sentences and classify the text sentences based on the semantic relationships using the classifier — S40

(56) References Cited

U.S. PATENT DOCUMENTS

| | | | | |
|---|---|---|---|---|
| 6,654,740 | B2* | 11/2003 | Tokuda | G06K 9/6247 707/769 |
| 6,697,779 | B1* | 2/2004 | Bellegarda | G10L 17/04 704/246 |
| 6,757,646 | B2* | 6/2004 | Marchisio | G06F 16/334 704/8 |
| 6,862,566 | B2 | 3/2005 | Wakita et al. | |
| 6,862,710 | B1* | 3/2005 | Marchisio | G06F 16/954 715/206 |
| 7,167,823 | B2* | 1/2007 | Endo | G06K 9/6218 704/7 |
| 7,526,425 | B2* | 4/2009 | Marchisio | G06F 16/3338 704/9 |
| 8,738,354 | B2* | 5/2014 | Platt | G06F 40/40 704/2 |
| 9,436,760 | B1* | 9/2016 | Tacchi | G06F 16/3344 |
| 2002/0026456 | A1* | 2/2002 | Bradford | G06F 40/30 715/210 |
| 2002/0198697 | A1* | 12/2002 | Datig | G06N 3/004 704/1 |
| 2003/0216919 | A1* | 11/2003 | Roushar | G06F 40/289 704/260 |
| 2004/0260543 | A1* | 12/2004 | Horowitz | G10L 15/26 704/221 |
| 2005/0143971 | A1* | 6/2005 | Burstein | G06F 40/253 704/4 |
| 2005/0209844 | A1* | 9/2005 | Wu | G06F 40/129 704/2 |
| 2005/0288920 | A1* | 12/2005 | Green | G06F 40/58 704/3 |
| 2006/0025995 | A1* | 2/2006 | Erhart | G10L 15/1822 704/239 |
| 2006/0190241 | A1* | 8/2006 | Goutte | G06F 40/45 704/2 |
| 2006/0224566 | A1 | 10/2006 | Flowers et al. | |
| 2006/0259481 | A1* | 11/2006 | Handley | G06F 16/355 |
| 2006/0265209 | A1* | 11/2006 | Bradford | G06F 40/42 704/9 |
| 2007/0136067 | A1* | 6/2007 | Scholl | H04M 3/4938 704/270 |
| 2008/0235216 | A1* | 9/2008 | Ruttenberg | G06F 16/9535 |
| 2011/0054884 | A1* | 3/2011 | Drakwall | G06Q 50/18 704/9 |
| 2011/0264443 | A1* | 10/2011 | Takamatsu | G06F 16/30 704/9 |
| 2011/0301942 | A1* | 12/2011 | Collobert | G06F 40/211 704/9 |
| 2011/0313852 | A1* | 12/2011 | Kon | G06Q 30/0247 705/14.46 |
| 2012/0131055 | A1* | 5/2012 | Schindler | G06F 40/30 707/776 |
| 2013/0066870 | A1* | 3/2013 | Somasundaran | G06F 19/00 707/737 |
| 2013/0226562 | A1* | 8/2013 | Arnon | G06F 40/111 704/9 |
| 2013/0246046 | A1* | 9/2013 | Fan | G06F 40/30 704/9 |
| 2013/0262096 | A1* | 10/2013 | Wilhelms-Tricarico | G10L 25/30 704/202 |
| 2014/0081626 | A1* | 3/2014 | Chang | G06F 40/30 704/9 |
| 2015/0178273 | A1* | 6/2015 | Hakkani-Tur | G06F 40/40 704/9 |
| 2016/0064006 | A1* | 3/2016 | Disch | G10L 19/008 704/500 |
| 2016/0092427 | A1* | 3/2016 | Bittmann | G06F 40/30 704/9 |
| 2016/0283467 | A1* | 9/2016 | Dascalu | G06F 16/3344 |
| 2017/0116204 | A1* | 4/2017 | Davulcu | G06F 16/355 |
| 2017/0286231 | A1* | 10/2017 | Adyapak | G06F 16/2322 |
| 2019/0380657 | A1* | 12/2019 | Pereira | G16H 30/40 |

FOREIGN PATENT DOCUMENTS

| | | |
|---|---|---|
| CN | 104281645 A | 1/2015 |
| CN | 105160046 A | 12/2015 |
| CN | 105550190 A | 5/2016 |
| CN | 105938495 A | 9/2016 |

OTHER PUBLICATIONS

Office Action dated Nov. 21, 2019, issued in counterpart CN application No. 2016109728742, with English translation. (16 pages).

* cited by examiner

INFORMATION EXTRACTION METHOD AND APPARATUS

CROSS-REFERENCE TO RELATED APPLICATIONS

This application claims the benefit of the filing date of Chinese Patent Application No. 201610972874.2 filed on Oct. 28, 2016, the disclosure of which is hereby incorporated by reference.

TECHNICAL FIELD

This invention relates to a smart apparatus technology, and more particularly, to an information extraction method and apparatus.

BACKGROUND

In most technical fields, most of the knowledge comes from unstructured text. With rapid development of various fields, research literature expands exponentially and enriches relevant knowledge in various fields.

However, the exploding growth of research literature goes far beyond a speed of people analyzing the literature. It is very difficult for researchers to find needed information quickly from a literature library. Therefore, helping researchers to extract useful information quickly from massive literature has attracted wide attention from academia and industry.

BRIEF SUMMARY

Accordingly one example of the present disclosure is an information extraction method. The information extraction method may comprise providing r semantic relationships, acquiring entity pairs corresponding to the semantic relationships, acquiring first instances based on the entity pairs, and eliminating instances that do not have the semantic relationships from the first instances to obtain second instances. r is a positive integer. each of the entity pairs contains a pair of named entities, and the first instances are sentences containing the entity pairs.

Acquiring the entity pairs corresponding to the semantic relationships and acquiring the first instances based on the entity pairs may comprise acquiring the entity pairs corresponding to the semantic relationships from a knowledge base; tagging sentences that contain the named entities of all the entity pairs in a database using a named entity recognition tool; and retrieving the first instances containing the entity pairs from the tagged sentences.

Eliminating the instances that do not have the semantic relationships from the first instances to obtain the second instances may comprise extracting first features from each of the first instances based on the entity pairs to construct a first instance-feature matrix $M_{nf}$, and constructing a semantic relationship-first instance matrix $M_m$. The first features may comprise lexical features and/or syntactic features. n is a number of the first instances and f is a total number of all the first features.

Eliminating the instances that do not have the semantic relationships from the first instances to obtain the second instances may further comprise obtaining a semantic relationship-feature matrix $M_{rf}$, wherein $M_{rf} = M_m * M_{nf}$, decomposing the semantic relationship-feature matrix $M_{rf}$ into $M_{rk} * M_{kf}$ by a nonnegative matrix factorization method, obtaining $M_{nk}$ by multiplying $M_{nf}$ by $M_{kf}^T$, obtaining similarity between each of the first instances and all the semantic relationships respectively based on $M_{nk}$ and $M_{rk}^T$, and screening out the second instances from the first instances based on the similarity. $M_{rk}$ is a representation matrix of the semantic relationships in a latent semantic space and $M_{nk}$ is a representation matrix of the first instances in the latent semantic space.

Obtaining the similarity between each of the first instances and all the semantic relationships respectively based on $M_{nk}$ and $M_{rk}^T$ may comprise obtaining the similarity between each of the first instances and all the semantic relationships respectively through cosine similarity based on $M_{nk}$ and $M_{rk}^T$.

Screening out the second instances from the first instances based on the similarity may comprise normalizing the similarity so that a sum of the normalized similarity of each of the first instances with all of the semantic relationships respectively is 1, obtaining an information entropy of each of the first instances based on the normalized similarity of each of the first instances with all of the semantic relationships respectively, and selecting the first instances whose information entropy is less than a predetermined threshold as the second instances.

The information extracting method may further comprise extracting second features from the second instances based on the entity pairs to train a classifier, wherein the second features comprise lexical features and/or syntactic features. The information extracting method may further comprise identifying semantic relationships from text sentences and classifying the text sentences based on the semantic relationships using the classifier.

Identifying the semantic relationships from the text sentences and classifying the text sentences using the classifier may comprise using the named entity recognition tool to tag sentences that contain the named entities in a database, retrieving text sentences containing the entity pairs from the tagged sentences, and identifying semantic relationships of the entity pairs in the text sentences according to the classifier, and classifying the text sentences based on the semantic relationships according to the classifier.

The lexical features may include at least one selected from the group consisting of entity pair's position in a sentence, word sequence between the entity pairs, characteristic sequence between the entity pairs, left window of size X of the entity pair, and right window of size X of the entity pair, wherein X≥0. The syntax features may include at least one selected from the group consisting of the shortest dependency path between the entity pairs, left window of size Y of the entity pair, and right window of size Y of the entity pair, wherein Y≥0.

Another example of the present disclosure is an information extracting apparatus. The information extracting apparatus may comprise an acquisition module and a screening module. The acquisition module may be configured to obtain entity pairs corresponding to a given semantic relationship and acquire first instances based on the entity pairs. The screening module may be configured to remove instances that do not have the given semantic relationship from the first instances to obtain second instances. The first instances are sentences containing the entity pairs and each of the entity pairs contains a pair of named entities.

That the acquisition module is configured to obtain entity pairs corresponding to a given semantic relationship and acquire first instances based on the entity pairs may comprise that the acquisition module is configured to obtain the entity pairs corresponding to the given semantic relationship from a knowledge base, use a named entity recognition tool to tag sentences in a database that contain the named entities of all the entity pairs, and retrieve the first instances containing the entity pairs from the tagged sentences.

That the screening module is configured to remove instances that do not have the given semantic relationship from the first instances to obtain second instances may comprise that the screening module is configured to extract first features from each of the first instances based on the entity pairs, construct a first instance-feature matrix $M_{nf}$, and construct a semantic relationship-first instance matrix $M_{rn}$, wherein n is a number of the first instance, f is a number of all the first features, and the first features comprise lexical features and/or syntactic features.

That the screening module is configured to remove instances that do not have the given semantic relationship from the first instance to obtain second instances may further comprise that the screening module is configured to obtain a semantic relationship-feature matrix $M_{rf}$, wherein $M_{rf}=M_{rn}*M_{nf}$, decompose the semantic relationship-feature matrix $M_{rf}$ into $M_{rk}*M_{kf}$ by a nonnegative matrix factorization method, wherein k<f, obtain $M_{nk}$ by multiplying $M_{nf}$ by $M_{kf}^T$, and obtain similarity between each of the first instances and all the semantic relationships respectively based on $M_{nk}$ and $M_{rk}^T$, and screen out the second instances from the first instances based on the similarity. r is a number of the semantic relationships, $M_{rk}$ is a representation matrix of the semantic relationships in a latent semantic space, and $M_{nk}$ is a representation matrix of the first instances in the latent semantic space.

Obtain the similarity between each of the first instances and all the semantic relationships respectively based on $M_{nk}$ and $M_{rk}^T$ may comprise obtain the similarity between each of the first instances and all the semantic relationships respectively through cosine similarity based on $M_{nk}$ and $M_{rk}^T$. Screen out the second instances from the first instances based on the similarity may comprise normalize the similarity so that a sum of nonnalized similarity of each of the first instances and all of the semantic relationships respectively is 1, obtain an information entropy of each of the first instances based on the normalized similarity of each of the first instances and all of the semantic relationships respectively, and select the first instances whose information entropy is less than a predetermined threshold as the second instances.

The information extracting apparatus may further comprise a classifier training module and an information extraction module. The classifier training module may be configured to extract first features from the second instances based on the entity pairs to train the classifier. The information extraction module may be configured to identify semantic relationships from text sentences using the classifier and classify the text sentences based on the semantic relationships using the classifier.

That the information extraction module is configured to identify semantic relationships from text sentences and classify the text sentences using the classifier may comprise that the information extraction module is configured to use the named entity recognition tool to tag sentences in a database that contain named entities of the entity pairs, retrieve text sentences containing the entity pairs from the tagged sentences, identify semantic relationships based on the entity pairs in the instances using the classifier, and classify the text sentences based on the semantic relationships using the classifier.

The lexical features may include at least one selected from the group consisting of entity pair's position in a sentence, word sequence between the entity pairs, characteristic sequence between the entity pairs, left window of size X of the entity pair, and right window of size X of the entity pair, wherein X≥0. The syntax features may include at least one selected from the group consisting of the shortest dependency path between the entity pairs, left window of size Y of the entity pair, and right window of size Y of the entity pair, wherein Y≥0.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-8. When referring to the figures, like structures and elements shown throughout are indicated with like reference numerals. It will be apparent that the described embodiments are merely part of the embodiments and are not intended to be exhaustive example. All other embodiments obtained by those of ordinary skill in the art without making creative work are within the scope of the present disclosure.

This invention relates to a relation extraction method, which aims to identify and categorize relations between pairs of entities in text. Traditional relation extraction methods usually need a lot of annotated data as training corpus. However, annotating data by human is time-consuming and expensive.

To address this limitation, the present invention presents a method which can automatically gather labeled data by heuristically aligning entities in text with those in a knowledge base. However, this method often results in a noisy training corpus because sentences that mention two entities are likely to express different relations in a knowledge base. For example, if entities "Steve Jobs" and "Apple" have "CEO of" relation in a knowledge base, then the method will extract all sentences containing both entities, e.g. "Steve Jobs is the CEO of Apple" and "Steve Jobs founded Apple in 1976", from a given text corpus. But, in fact, "Steve Jobs is the CEO of Apple" expresses the relation "CEO of" and "Steve Jobs founded Apple in 1976"

expresses the relation "Founder of". So "Steve Jobs founded Apple in 1976" is a noisy training instance for relation "CEO of". To address this problem, the present invention improves the above method by identifying reliable instances from noisy instances by inspecting whether an instance is located in a semantically consistent region. Specifically, given some training instances, the method first models each relation type as a linear subspace spanned by its training instances. Then, the local subspace around an instance is modeled and characterized by seeking the sparsest linear combination of training instances which can reconstruct the instance.

In summary, compared with traditional methods of manual labeling, the method present by the present invention can automatically gather labeled data by considering the semantic consistence between gathered instances and given training instances, which can save a lot of time and labor costs. Thus, the present invention improves efficiency and accuracy, and reduces cost relative to the traditional methods.

Specifically, the present invention has at least the following advantages:

First, the present invention uses supervised learning methods, which improves accuracy of the extraction.

Second, compared with the traditional semantic relation extraction method based on supervised learning, the present invention uses an automatic annotation method of training corpus based on matrix decomposition, which can automatically label a large amount of training data based on a given knowledge base, thereby reducing annotation cost. In the field of machine learning, supervised learning requires manual training of certain training data, but the cost of manual labeling is very high. So the present invention has great advantages in obtaining a fairly accurate model with less manual annotation. The basic concept of the present invention is to use the relevant knowledge in an existing knowledge base to automatically label the training data, thereby reducing the cost of manual labeling Furthermore, the matrix representation is used to compute the semantic consistence between gathered instances and some given training instances.

Figure 1:
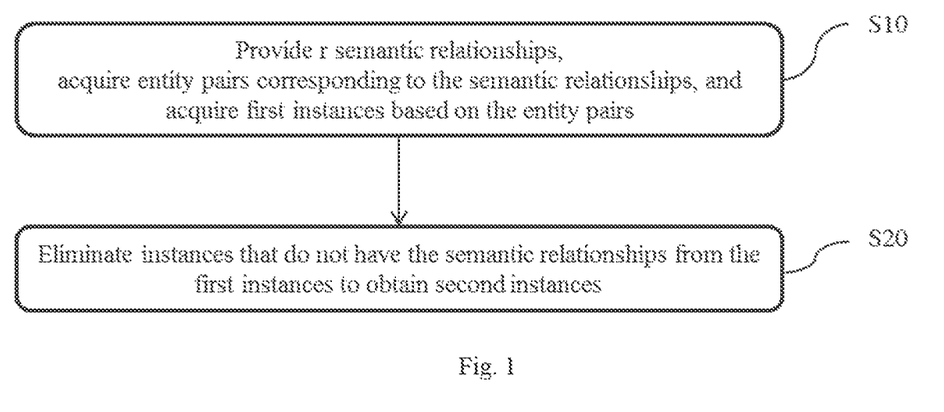
FIG. 1 is a flow chart of an information extraction method according to an embodiment.

FIG. 1 shows a flow chart of an information extraction method according to an embodiment. As shown in FIG. 1, the information extraction method comprises step S10 and step S20.

In step S10, semantic relationships are first provided. Then, entity pairs corresponding to the semantic relationships are obtained. Then, first instances are obtained based on the entity pairs. The first instances comprise sentences containing the entity pairs.

The semantic relationships and the entity pairs are not limited to any particular technical field as long as there is a database of the semantic relationships and a database of the entity pairs corresponding to the semantic relationships. Here the database can be selected from existing databases or newly made databases based on needs. Embodiments of the present disclosure use examples in a medical field merely for purpose of illustration. In addition, specific methods for obtaining the first instances are not limited as long as the first instances obtained comprise sentences containing the entity pairs.

In step S20, instances that do not have the given semantic relationships are removed from the first instances to form second instances. That is, sentences in the first instance that do not have the given semantic relationships are removed. Normally sentences that do not have the given semantic relationships are called noise data. After the noise data is removed from the first instances, second instances are obtained. Specific method of removing the noise data is not limited herein.

An example of the present disclosure is an information extraction method. According to given semantic relationships, entity pairs corresponding to the semantic relationships are obtained. First instances are obtained based on the entity pairs. The first instances are screened with the given semantic relationships to get second instances. That is, sentences that do not have the given semantic relationships are removed from the first instances. As such, noise data is eliminated from the sample data. In this way, when the sample data is used to train a model, accuracy of the model can be improved, and accordingly accuracy of acquired information can be improved.

Figure 2:
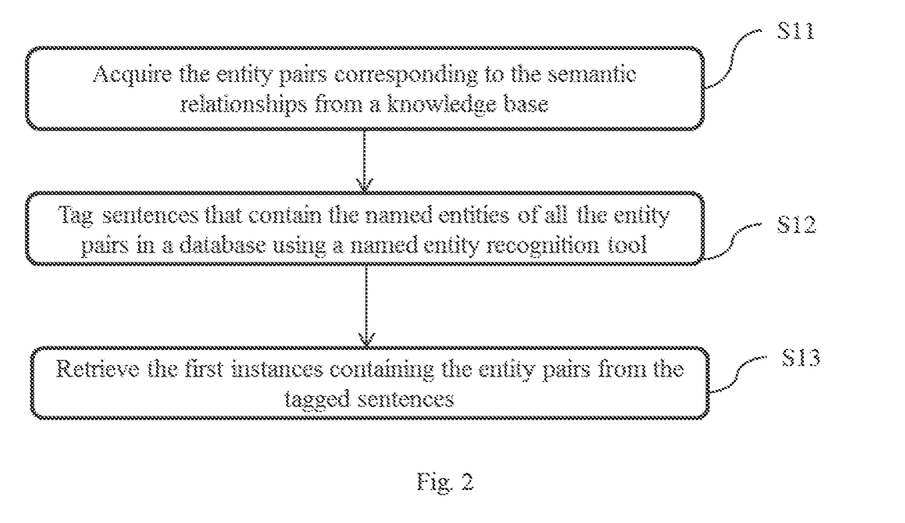
FIG. 2 is a flow chart of a method of obtaining first instances containing entity pairs from a database according to an embodiment.

In one embodiment, as shown in FIG. 2, step S10 includes step S11 to step S13.

In step S11, according to given semantic relationships, entity pairs corresponding to the semantic relationships are obtained from a knowledge base.

In the medical field, the Unified Medical Language System (UMLS) consists of four parts: metathesaurus, semantic network, information sources map, and specialist lexicon. In one embodiment, the given semantic relationships comprise at least one of the 54 semantic relationships classified in the semantic network.

The knowledge base may be a pre-selected existing knowledge base. For example, it may be a knowledge base normally used by an ordinary skill person in the art such as UMLS.

An entity pair refers to two entities that have a certain semantic relationship in the knowledge base. The entity may be, for example, a disease, a drug, a gene, or the like. The entity pair referred to in the embodiment of the present disclosure may be a plurality of entity pairs, as long as each entity pair corresponds to a given semantic relationship.

The database is a database containing text, for example, an existing database such as CNKI (China National Knowledge Internet) or Wanfang. Here, the type of the text is not limited. For example, it can be papers, journals, books, and so on.

In addition, in embodiments of the present disclosure, there is one or more first instances containing the entity pairs obtained from the database, and not each of the instances expresses the given semantic relationship. For example, a semantic relationship given is "treatment". It is found from the knowledge base that entity pairs having this semantic relationship are "metformin" and "gestational diabetes", "aspirin" and "cold". Instance 1 retrieved is "aspirin can be used to treat the cold." Instance 2 retrieved is "scientists claim that aspirin is one of the culprits of the 1981 cold epidemic." Instance 3 retrieved is "metformin is the first choice for the treatment of gestational diabetes." The semantic relationships between the entity pairs in Instance 1 and Instance 3 can be read as "treatment". However, In Instance 2, the semantic relationship between the entity pair can be read as "caused" rather than "treated." Thus, Instance 2 is noise data and removed. Only Instance 1 and Instance 3 are screened out as second instances.

In step S12, using a Named Entity Recognition tool, the sentences containing the named entities in a database are tagged.

The Named Entity Recognition (NER) refers to entities that have specific meanings in the recognition text, which mainly include names of persons, names of places, organization names, proper nouns, drug names, gene names, and disease names, and so on. When using a named entity recognition tool, entities with the above-mentioned specific meanings contained in the sentence are tagged. By tagging entities in sentences, the sentences containing the named entities are tagged.

In step S13, the first instances containing the entity pairs are retrieved from the tagged sentences.

That is, the sentences containing the given entity pairs (i.e., the entity pairs acquired in S11) are retrieved from only the sentences tagged in step S12. Other sentences are removed. If the sentence contains only one entity in a given entity pair, the sentence is also removed.

The embodiment of the present disclosure obtains first instances containing entity pairs from a database by using a named entity recognition tool. The named entity recognition tool is a mature technology. Furthermore, this method is efficient and has low cost.

Figure 3:
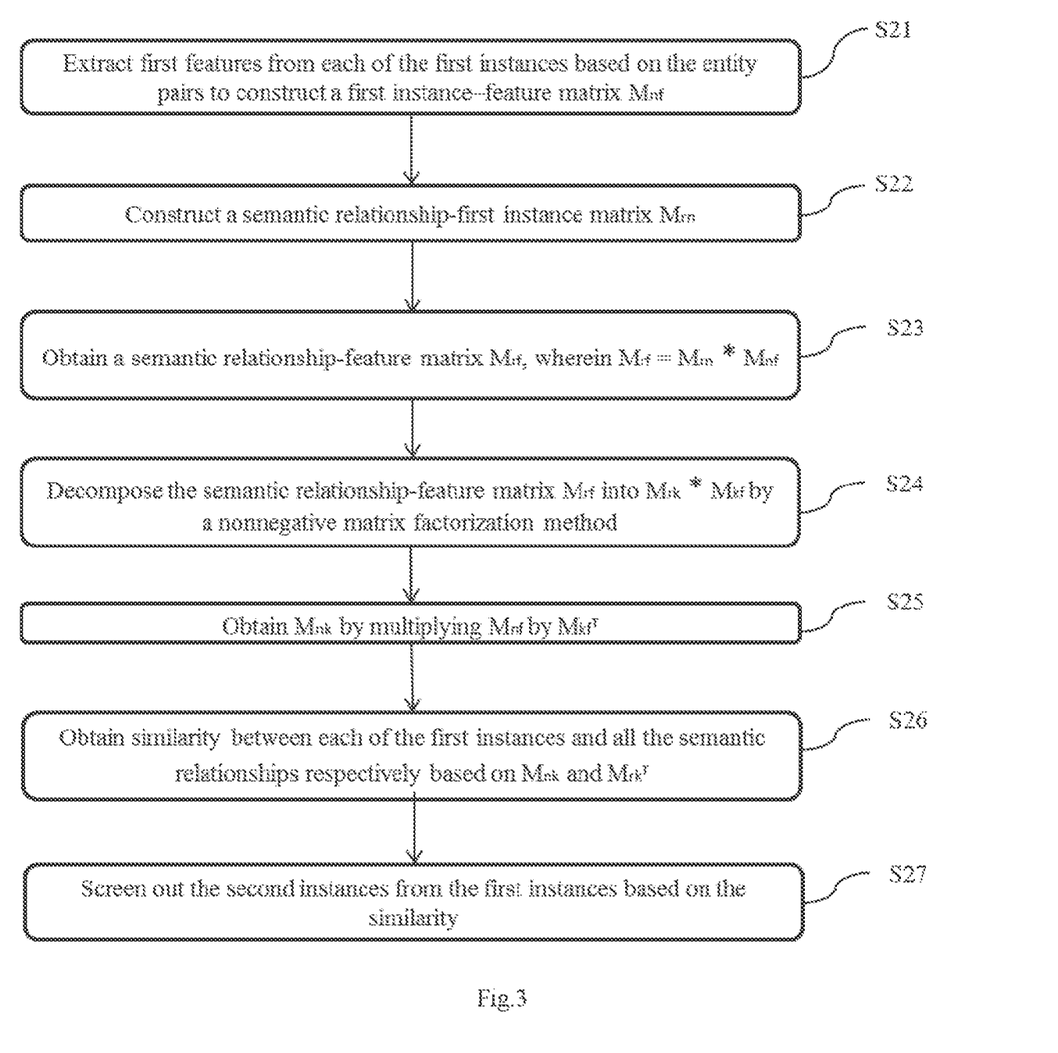
FIG. 3 is a flow chart of a method of screening out second instances from the first instances according to an embodiment.

In one embodiment, as shown in FIG. 3, step S20 includes step S21 to step S27.

In step S21, first features are extracted from each of the first instances based on the entity pairs to construct a first instance-feature matrix $M_{nf}$. n is the number of the first instances, and f is the number of all the first features. The first features include lexical features and/or syntactic features.

In one embodiment, first features are extracted from each of the first instances according to the entity pairs. Extracting the first features may comprise extracting lexical features and/or syntactic features in each sentence of the first instances having the entity pairs, and then taking intersection or union of the extracted lexical features and/or syntactic features. Of course, there can be other ways to extract.

The first instance-feature matrix $M_{nf}$ is constructed, that is, whether each of the first instances has the extracted first features is determined. In the first instance-feature matrix $M_{nf}$, each row of data may indicate whether the first instance corresponding to the row has the extracted first features. For example, "1" may indicate that the first instance has a first feature, and "0" may indicate that the first instance does not have a first feature. In the following embodiment, "1" represents the first instance having a certain first feature, and "0" represent the first instance without a certain first feature.

For example, there are four first instances, that is n=4. Six first features are extracted, that is f=6. Instance 1 has a first and a third first feature. Instance 2 has a first and a fourth first feature. Instance 3 has a fifth and a sixth first feature. Instance 4 has a second and a third first feature. The obtained first instance-feature matrix $M_{nf}$ is:

$$M_{46} = \begin{bmatrix} 101000 \\ 100100 \\ 000011 \\ 011000 \end{bmatrix}.$$

In step S22, a semantic relationship-first instance matrix $M_{rn}$ is constructed. r is the number of semantic relationships.

In one embodiment, in the semantic relationship-first instance matrix $M_{rn}$, first, a plurality of semantic relationships is given. Each column of data in the matrix may indicate whether the first instance corresponding to the column belongs to any of the semantic relations. For example, "1" means that the first instance belongs to a semantic relationship, and "0" means that the first instance does not belong to a semantic relationship.

For example, five semantic relationships are given, that is, r=5. There are four first instances. Instance 1 and Instance 2 belong to the first semantic relationship. Instance 1 and Instance 3 belong to the second semantic relationship. Instance 1 and Instance 4 belong to the third semantic relationship. Instance 2 and Instance 3 belong to the fourth semantic relationship. Instance 3 and Instance 4 belong to the fifth semantic relationship. Then the obtained semantic relationship-first instance matrix $M_{rn}$ is:

$$M_{54} = \begin{bmatrix} 1100 \\ 1010 \\ 1001 \\ 0110 \\ 0011 \end{bmatrix}.$$

In step S23, a semantic relationship-feature matrix $M_{rf}$ is constructed, wherein $M_{rf}=M_{rn}*M_{nf}$. That is, the semantic relationship-feature matrix $M_{rf}$ is obtained by multiplying the semantic relationship-first instance matrix $M_{rn}$ by the first instance-feature matrix $M_{nf}$.

For example, based on the above examples, $M_{54}$ and $M_{46}$ are multiplied to obtain a semantic relationship-feature matrix $M_{rf}$, which is $$M_{56} = \begin{bmatrix} 201100 \\ 101011 \\ 112000 \\ 100111 \\ 011011 \end{bmatrix}.$$

In step S24, the semantic relationship-feature matrix $M_{rf}$ is decomposed into $M_{rk}*M_{kf}$ by non-negative matrix factorization (NMF), wherein k<f and $M_{rk}$ is a representation matrix of the semantic relationships in a latent semantic space.

The nonnegative matrix factorization (NMF) is to find two low-rank non-negative matrixes $M_{rk}$ and $M_{kf}$, so that $M_{rf}=M_{rk}*M_{kf}$. Non-negative matrix factorization process can be realized by using MATLAB, C, C++ or other language programs.

Here, the non-negative matrix factorization of the semantic relationship-feature matrix $M_{rf}$ may be performed by filtering the f first features extracted in step S21 to select k first features which have relatively high repetition rates or are relatively more important. That is, the semantic relationship-feature matrix $M_{rf}$ is mapped into a latent semantic space to obtain a representation matrix $M_{rk}$ of the semantic relationships in the latent semantic space and a representation matrix $M_{kf}^T$ of the first features in the latent semantic space. $M_{rk}$ and $M_{kf}$ are obtained by non-negative matrix factorization of $M_{rf}$. Then, $M_{kf}$ is transposed to obtain $M_{kf}^T$. In one embodiment, in order to improve desirability of samples, n, r, f are relatively large numbers. As such, in practice, k may be much smaller than f. For example, when k=3, $M_{56}$ is decomposed into $M_{56}=M_{53}*M_{36}$.

In step S25, $M_{nk}$ is obtained by multiplying $M_{nf}$ by $M_{kf}^T$. $M_{nk}$ is a representation matrix of the first instances in the latent semantic space. That is, the first instance-feature matrix $M_{nf}$ is multiplied by the representation matrix of the first feature in the latent semantic space $M_{kf}^T$ to obtain the representation matrix $M_{nk}$ of the first instance in the latent semantic space. For example, $M_{43}=M_{46}*M_{36}^T$.

In step S26, similarity between each of the first instances and the semantic relationships respectively are obtained based on $M_{nk}$ and $M_{rk}^T$.

In one embodiment, $M_{nk}$ can be multiplied by $M_{rk}^T$ to obtain the representation matrix of the first instance-semantic relationship in the latent semantic space. Each row of data in the matrix represents the similarity between the first instance represented by the row and each of the semantic relationships respectively. Of course, other computing methods can also be used to get the similarity between first instance and semantic relationships.

For example, $M_{nk}$ is multiplied by $M_{rk}^T$ to obtain a representation matrix of the first instance-semantic relationship in the latent semantic space, which is $$M_{34} = \begin{bmatrix} 2374 \\ 2211 \\ 3258 \end{bmatrix}.$$

The first row of data in the matrix (2,3,7,4) indicates that the similarity between Instance 1 and the first semantic relationship is 2. The similarity between Instance 1 and the second semantic relationship is 3. The similarity between Instance 1 and the third semantic relationship is 7. The similarity between Instance 1 and the fourth semantic relationship is 4. Likewise, the similarity between each of the instances and each of the semantic relationships respectively can be obtained.

In step S27, the first instances are screened based on the similarity to obtain second instances. That is, based on the similarity between each of the first instances and each of the semantic relationships respectively calculated in step S26, the first instances having obvious differences in terms of the similarity are selected as the second instances. For example, in the above-mentioned matrix $$M_{34} = \begin{bmatrix} 2374 \\ 2211 \\ 3258 \end{bmatrix}$$

representing the similarity between three first instances and four semantic relationships, the similarity between Instance 1 and the third semantic relationship is relatively high. As such, it can be clearly determined that instance 1 belongs to the third semantic relationship. The difference in terms of the similarity between Instance 2 and the four semantic relationships is not large. As such, it cannot be clearly determined that which semantic relationship instance 2 belongs. Instance 3 has a high similarity with the fourth semantic relationship. As such, it is clearly determined that it belongs to the fourth semantic relationship. Thus, Instances 1 and 3 of the first instance are screened out as second instances.

In the embodiment of the present disclosure, the semantic relationships, the instances, and the features are first mapped into the latent semantic space by a nonnegative matrix factorization method. Then, the similarity between each of the first instances and the semantic relationships respectively is obtained in the latent semantic space. Then, based on whether there is clear difference in similarity, that is, whether it can be clearly determined that an instance belongs to a certain semantic relationship, the second instances are screened out from the first instances. This data selection method based on matrix decomposition has advantages such as small amount of calculation and high efficiency during process of removing noise data.

In one embodiment, obtaining the similarity between each of the first instances and the semantic relationships respectively is obtained based on $M_{nk}$ and $M_{rk}^T$ comprises:

The similarity between each of the first instances and the semantic relationships respectively is obtained through cosine similarity based on $M_{nk}$ and $M_{rk}^T$. The cosine similarity is to use a cosine value of an angle of two vectors in a vector space as a measure of difference between the two vectors. The closer the cosine value is to 1, the closer the angle is to 0 degree, and the more similar the two vectors are. In the present disclosure, each row of data in $M_{nk}$ and each column of data in $M_{rk}^T$ are used as a vector respectively. The similarity between the first instances and the semantic relationships is obtained by calculating the cosine similarity.

In this embodiment, the similarity between each of the first instances and the semantic relationships respectively is obtained by calculation of the cosine similarity. This method not only obtains excellent results, but also is quick, convenient, and simple.

Figure 4:
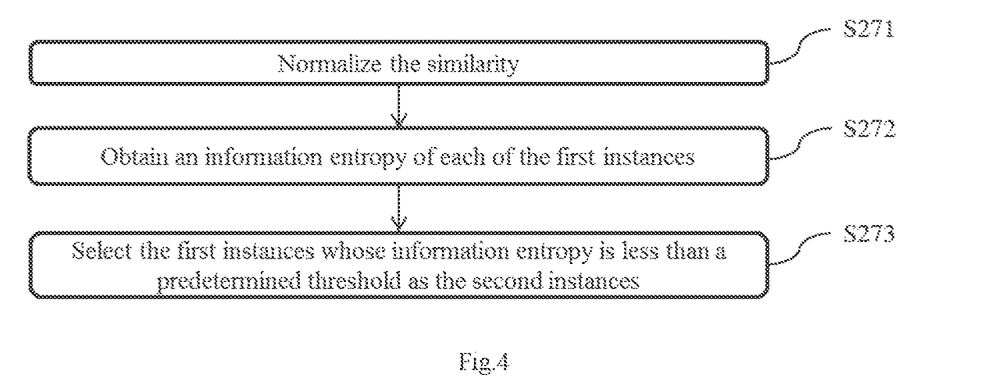
FIG. 4 is a flow chart of a method of screening out second instances from the first instances based on similarity according to an embodiment.

In one embodiment, as shown in FIG. 4, screening out second instances from the first instances based on the similarity comprises step S271 to step S273.

In step S271, the similarity is normalized so that a sum of normalized similarity between each of the first instances and all semantic relationships respectively is 1.

The normalization comprises: mapping a group of data in a parenthesis to a group of numbers within a range of 0 and 1, and a sum of the group of numbers becomes 1. Then, a ratio of each number to the sum of the group of numbers is written down. By normalizing the similarity, the similarity between each of the first instances and the semantic relationships respectively can be considered as a probability distribution.

For example, the similarity between Instance 1 and all semantic relationships respectively calculated by step S26 is (2, 3, 7, 4). The similarity between Instance 1 and all semantic relationships respectively after normalization is $$\left( \frac{2}{2+3+7+4}, \frac{3}{2+3+7+4}, \frac{7}{2+3+7+4}, \frac{4}{2+3+7+4} \right).$$

That is (0.125, 0.1875, 0.4375, 0.25).

In step S272, information entropy of each of the first instances is calculated based on the similarity of the first instance after the normalization process. That is, the similarity between each of the first instances and all semantic relationships respectively is considered as a probability distribution. Information entropy of each of the first instances is calculated according to calculation formula of the information entropy. Information is an abstract concept. Entropy represents a physical quantity of a state of a material system, which indicates the extent to which the state may occur. The information entropy $$H(X) = -\sum_x p(x) \log p(x) \cdot p(x)$$

is probability that the first instance belongs to a semantic relationship, that is, the similarity between the normalized first instance and each of the semantic relationships respectively.

For example, the similarity between Instance 1 and all semantic relationships respectively is (0.125, 0.1875, 0.4375, 0.25). Then the information entropy of Instance 1 is H=−(0.125 log 0.125+0.1875 log 0.1875+0.4375 log 0.4375+0.25 log 0.25)=0.5567856.

In step S273, the first instances whose information entropy is smaller than a predetermined threshold are selected as the second instances.

The lower the information entropy, the more definite the information contained in the first instance, as the instances which have low information entropy are more favorable to the training model. Thus, the first instances whose information entropy is greater than the predetermined threshold are noise data. Accordingly, the second instances are selected from the first instances based on the information entropy of each of the first instances, thereby removing the noise data.

In addition, a value of the predetermined threshold of the information entropy is not limited herein, and the value can be reasonably determined based on data quantities.

For example, if the predetermined threshold of the information entropy is 0.6, the above Instance 1 having information entropy of 0.5567856 will be selected as the second instance. If the predetermined threshold of the information entropy is 0.5, the above Instance 1 having information entropy of 0.5567856 will not be selected as the second instance. Instead, it will be removed as the noise data.

In the embodiment of the present disclosure, the similarity is normalized so that a sum of the similarity between each of the first instances and all semantic relationships respectively is 1. Then, the similarity is regarded as a probability distribution. Information entropy of each of the instances is calculated. Then, instances having information entropy larger than a predetermined threshold are removed as noise data. As such, the second instances are selected from the first instances. In the present embodiment, amount of calculation thereof is small and acquisition is convenient.

Figure 5:
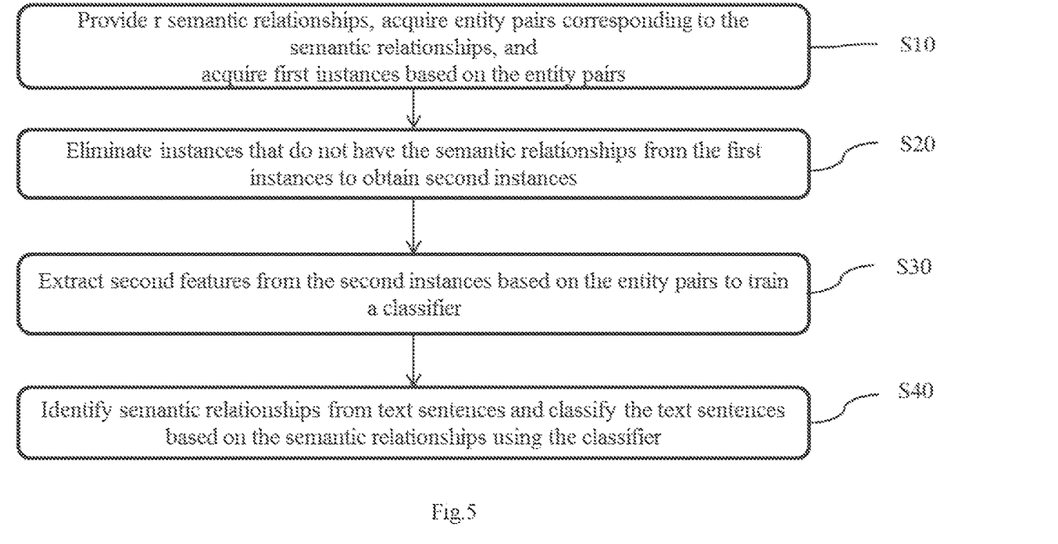
FIG. 5 is a flow chart of an information extraction method according to an embodiment.

In one embodiment, as shown in FIG. 5, the information extraction method further comprises step S30 and step S40.

In step S30, second features are extracted from each of the second instances based on the entity pairs to train a classifier. A target of the classifier is to classify based on given semantic relationships. The second features comprise lexical features and/or syntactic features.

Extracting the second features may comprise the following: extracting lexical features and/or syntactic features of the entity pairs in each sentence of the second instances, and then taking intersection or union of the extracted lexical features and/or syntactic features. Of course, there can be other ways to extract. The classifier is trained using the extracted second features. Here, types of lexical features and syntactic features are not limited herein.

Furthermore, a conventional method of training the classifier can be employed herein. The above extracted second features are used by the classifier. A final outputted result of the classifier is to classify text sentences into specific semantic relationships respectively.

In step S40, according to the classifier, semantic relationships are identified and text sentences are classified based on the semantic relationships. That is, the trained classifier is applied to a database to identify and classify semantic relationships between the entity pairs in the text sentences.

In the embodiment of the present disclosure, a classifier is trained by using the second instances (sample data) after eliminating the noise data. As such, parameters of the classifier trained by the second instances are more desirable, thereby improving accuracy of extracted information from the text sentences by the classifier.

In addition, through use of the trained classifier to supervise and learn from existing databases from long-distance, the semantic relationships between the entity pairs in the sentences are identified and the sentences are classified automatically, instead of manually tagging data. As such, cost of the tagging is reduced, coverage of semantic relationship extraction is improved, and the problem of sparse data is solved.

Figure 6:
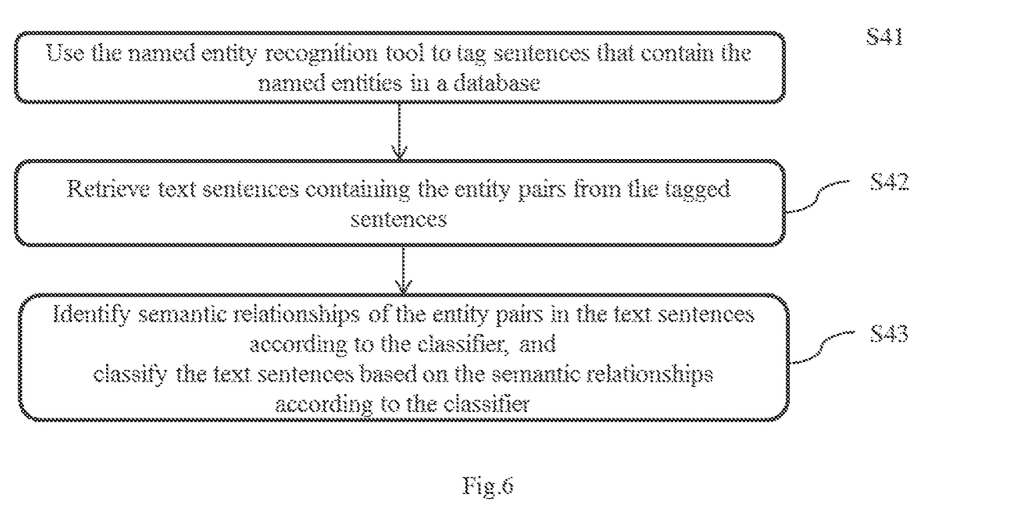
FIG. 6 is a flow chart of a method of classifying semantic relationships using a classifier according to an embodiment.

In one embodiment, as shown in FIG. 6, the above-described step S40 includes step S41 to step S43.

In step S41, a named entity recognition tool is used to tag sentences containing the named entities in a database.

In step S42, text sentences containing the entity pairs are retrieved from the tagged sentences.

In step S43, according to the classifier, semantic relationships of the entity pairs in the text sentences are identified and classified. That is, information extraction is performed for each of the text sentences extracted in step S42, and a final result of the output is which semantic relationship the entity pair in the text sentence belongs. For example, "1" represents belonging to a certain semantic relationship, and "0" represents not belonging to a certain semantic relationship.

In the embodiment, sentences containing named entities in a database are tagged by a named entity recognition tool. Then, text sentences that contain the entity pairs are retrieved. Then, the classifier is used to identify the corresponding semantic relationships of the entity pairs in the text sentences and classify the text sentences based on the semantic relationships. This embodiment has advantages such as using mature technology, low cost, and high efficiency.

In one embodiment, the lexical features include at least one of entity pair's position in a sentence, word sequence between the entity pair, characteristic sequence between the entity pair, left window of size X of the entity pair X, or right window a size X of the entity pair, wherein X≥0.

The syntax features include at least one of the shortest dependency path between the entity pairs, left window of size Y of the entity pair, or right window of size Y of the entity pair, wherein Y≥0.

The entity pair's position in a sentence refers to whether the pair of entities in the sentence is adjacent to each other or there are other words between the entity pair. The word sequence between the entity pair refers to the order of each of the entities located in the sentence, respectively. The characteristic sequence between the entity pair refers to characteristic of the words (such as nouns, verbs, etc.) before and between the pair of entities. The left window of size X of the entity pair refers to the number of words from the entity in the front to the beginning of the sentence. The right window of size X of the entity pair refers to the number of words from the entity in the front to the entity in the back. The shortest dependency path between the entity pair refers to the number of words between the pair of entities. The left window of size Y of the entity pair refers to number of words from the entity in the front to the beginning of the sentence in a tree view listed according to the syntax features. The right window of size Y of the entity pair refers to number of words from the entity in the front to the entity in the back in a tree view listed according to the syntax features.

Here, a feature refers to one feature or a combination of multiple features. When the feature refers to one feature, the text sentence containing this feature means that the text sentence has the feature. When the feature refers to a combination of two features, only that the text sentence includes the two features means that the text sentence is considered to contain the feature.

In addition, the X as the size of the left window of the entity pair and the X as the size of the right window of the entity pair can be the same or different. The Y as the size of the left window of the entity pair and the Y as the size of the right window Y of the entity pair can be the same or different. The values of X and Y may be the same or different.

A feature can be used as a number of features by changing parameters of the feature. For example, for the feature of left window of size X of the entity pair, the left window of size 3 of the entity pair, the left window of size 5 of the entity pair, the left window of size 6 of the entity pair each can be used as a feature.

For example, a retrieved text sentence is "scientists claim aspirin is one of the culprits of the 1981 cold epidemic." The position of the entity pair in the sentence is not adjacent to each other. If the extracted feature is the entity pair's position in the sentence being adjacent, the feature of the text sentence is "0." The word sequence of the entity pair in the text sentence is that the first entity is the third word and the second entity is the twelfth word. If the extracted feature is exactly the same as the above feature, the feature of the text sentence is "1." In the text sentence, the characteristic sequence of the word between the entity pair is "verb, numeral, preposition, determiner, noun, preposition, determiner, numeral." If the extracted feature is different from the above feature, the feature in the text sentence is "0." The size of the left window of the entity pair in the text sentence is three. If the extracted feature is the same as the above feature, the feature in the text sentence is "1." The size of the right window of the entity pair in the text sentence is zero, and if the extracted feature is different from the above feature, the feature in the text statement is "0." The shortest dependency path of the entity pair in the text sentence is eight words between the entity pairs. If the extracted feature is different from the above feature, the feature in the text statement is "0."

In the embodiment, the above lexical features and syntactic features are used as first features and second features. It is easy to determine the features and simple to apply the method.

Figure 7:
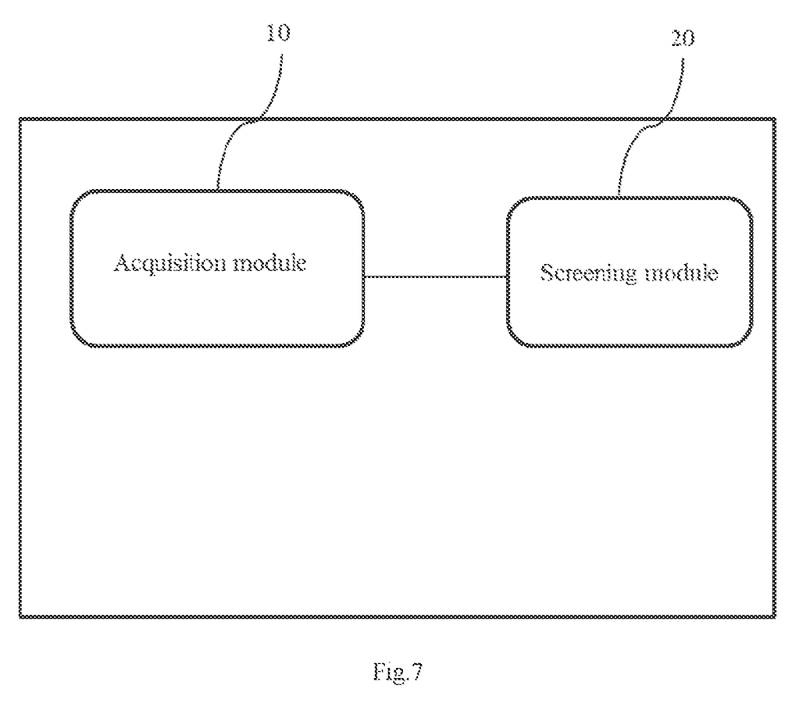
FIG. 7 is a schematic diagram of an information extracting apparatus according to an embodiment.
Figure 8:
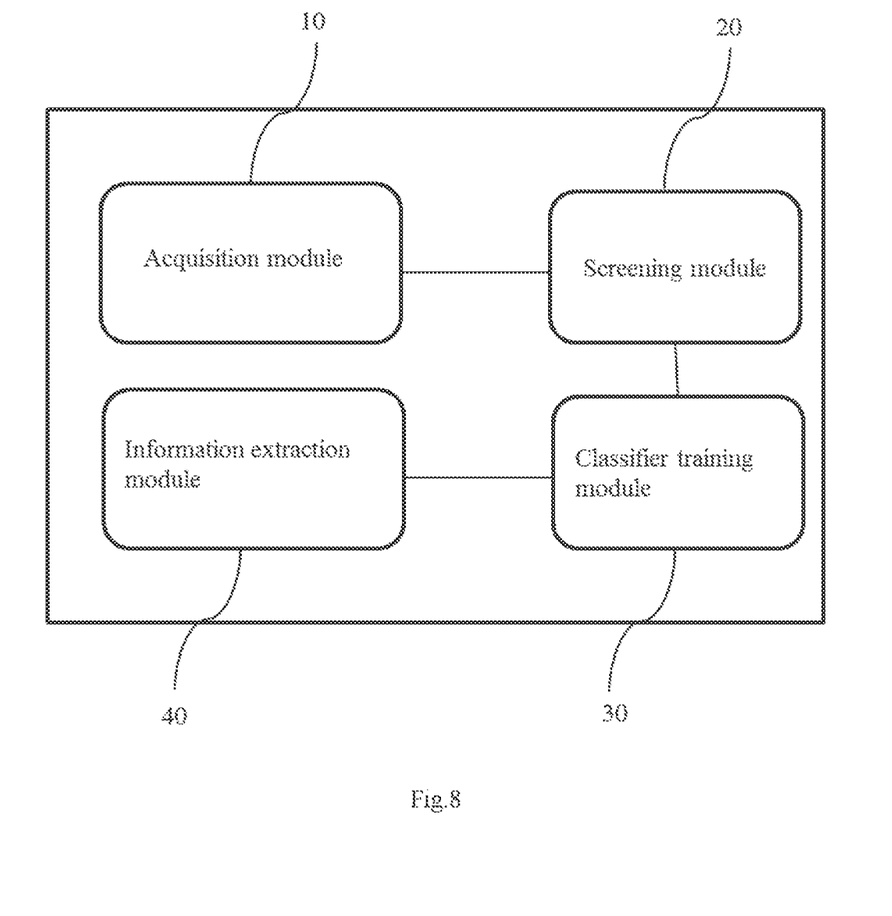
FIG. 8 is a schematic diagram of an information extracting apparatus according to an embodiment.

Another example of the present disclosure is an information extracting apparatus. As shown in FIG. 7, the information extracting apparatus comprises an acquisition module 10 and a screening module 20.

The acquisition module 10 is configured to acquire entity pairs corresponding to given semantic relationships and first instances corresponding to the entity pairs. The first instance is a sentence containing the entity pair.

The screening module 20 is configured to remove instances that do not have the given semantic relationships from the first instances to obtain second instances.

In an information extraction apparatus according to one embodiment, the acquisition module 10 acquires entity pairs corresponding to given semantic relationships. According to the entity pairs, the first instances are obtained. Then, the screening module 20 screens the first instances, and removes the first instances that do not have the given semantic relationship. The first instances having the given semantic relationship are screened out to form second instances, thereby removing noise data from sample data. In this way, when the sample data is used to train a model, accuracy of the model is improved. Accordingly, accuracy of the acquired information is improved.

In one embodiment, the acquisition module 10 comprises: acquiring entity pairs corresponding to given semantic relationships from a knowledge base, tagging sentences containing the named entities in the knowledge base using a named entity recognition tool, and retrieving first instances containing the entity pairs from the tagged sentences. In the embodiment of the present disclosure, the acquisition module 10 acquires the first instances containing the entity pairs from the database by using the named entity recognition tool. As such, efficiency is high, and cost is low.

In one embodiment, the screening module 20 comprises: extracting first features from each of the first instances according to the above-described entity pairs to construct a first instance-feature matrix $M_{nf}$, constructing a semantic relationship-first instance matrix $M_{rn}$, constructing a semantic relationship-feature matrix $M_{rf}$ wherein $M_{rf}=M_{rn}*M_{nf}$, decomposing the semantic relationship-feature matrix $M_{rf}$ into $M_{rk}*M_{kf}$ by a nonnegative matrix factorization method, wherein k<f, obtaining $M_{nk}$ by multiplying $M_{nf}$ by $M_{kf}^T$, obtaining similarity between each of the first instances and the semantic relationships respectively based on Mnk and Mrk$^T$; and screening out the second instances from the first instances based on the similarity.

n is the number of the first instances. f is the number of all the first features. The first features comprise lexical features and/or syntactic features. r is the number of the semantic relationships. $M_{rk}$ is a representation matrix of the semantic relationships in a latent semantic space. $M_{nk}$ is a representation matrix of the first instance in the latent semantic space;

In the embodiment of the present disclosure, the screening module 20 first maps the semantic relationships, instances, and features into the latent semantic space by using a nonnegative matrix factorization method. Then, similarity of each of the first instances and the semantic relationships respectively in the latent semantic space is obtained. Then, second instances are screened out from the first instances based on whether the similarity has a significant distinction, that is, whether it can be clearly determined from the similarity that an instance belongs to a semantic relationship. For this data retrieval method based on matrix decomposition, the amount of calculation is small and efficiency is high during the process of removing noise data.

In one embodiment, in the screening module 20, obtaining similarity between each of the first instances and the semantic relationships respectively based on $M_{nk}$ and $M_{rk}^T$ comprises: obtaining similarity between each of the first instances and the semantic relationships respectively through cosine similarity based $M_{nk}$ and $M_{rk}^T$. In the embodiment, the similarity between each of the first instances and the semantic relationships respectively is obtained by calculating the cosine similarity. This embodiment obtains excellent result, has quick speed, and is convenient and simple.

In one embodiment, in the screening module 20, screening out the second instances from the first instances based on the similarity comprises: normalizing the similarity so that a sum of the similarities of each of the first instances to all semantic relationships respectively is 1; calculating information entropy of each of the first instances based on the corresponding normalized similarities of each of the first instances; and selecting the first instances whose information entropy is smaller than a predetermined threshold as the second instances.

The embodiment of the present disclosure normalizes the similarity so that the sum of the similarities of each of the first instance to all semantic relationships respectively is 1.

Then, the similarity is regarded as a probability distribution to calculate the information entropy of each of the instances. Then, noise data is eliminated by selecting instances that satisfy the predetermined threshold of the information entropy. As such, the second instances are selected from the first instances. The calculation amount in this embodiment is small and the acquisition thereof is convenient.

In one embodiment, as shown in FIG. 7, the apparatus further comprises a classifier training module 30 and an information extraction module 40.

The classifier training module 30 is configured to extract first features from each of second instances based on the entity pairs to train the classifier. The target of the classifier is to classify based on given semantic relationships. The first features comprise lexical features and/or syntactic features.

The information extraction module 40 is configured to identify a given semantic relationship from a text sentence and classify it according to the classifier.

In the embodiment of the present disclosure, the classifier training module 30 employs the second instances (sample data) in which the noise data is removed to train the classifier. As such, parameters of the classifier trained by the second instances are more desirable. When the information extraction module 40 is used to extract information of a text sentence, accuracy of the extracted information is improved.

In addition, the present embodiment uses a trained classifier to supervise and learn from an existing database from long-distance and to identify and classify the semantic relationship based on the entity pair in the text sentence automatically, instead of manually tagging data. As such, cost of tagging is reduced, extraction coverage of the semantic relationships is improved, and problem of sparse data is solved.

In one embodiment, the information extraction module 40 comprises: tagging sentences that contain named entities in a database by a named entity recognition tool; retrieving text sentences containing the entity pairs from the tagged sentences: and identifying the corresponding semantic relationships of the entity pairs in the text sentences and classifying the text sentences based on the semantic relationships according to the classifier.

In the embodiment, the information extraction module 40 tags sentences containing named entities in the database using the named entity recognition tool. Then, the text sentences containing the entity pairs are retrieved from the tagged sentences. Then, the classifier is used to identify the corresponding semantic relationships of the entity pairs in the text sentences and classify the text sentences based on the semantic relationships. As such, cost is low and efficiency is high.

In one embodiment, the lexical features include at least one of entity pair's position in a sentence, word sequence between the entity pair, characteristic sequence between the entity pair, left window of a size of X of the entity pair, or right window of a size of X of the entity pair, wherein X≥0.

The syntax feature includes at least one of the shortest dependency path between the entity pairs, left window of a size of Y of the entity pair, or right window of a size of Y of the entity pair, wherein Y≥0.

The embodiment of the present disclosure uses the above lexical features and syntactic features as first features and second features. As such, it is easy to determine the features and simple to apply the method.

The descriptions of the various embodiments of the present disclosure have been presented for purposes of illustration, but are not intended to be exhaustive and the limitation is not limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

REFERENCE OF THE FIGURES

10—acquisition module
20—filter module
30—classifier training module
40—information extraction module

What is claimed is:

1. An information extraction method, comprising:
   providing r semantic relationships,
   acquiring entity pairs corresponding to the semantic relationships,
   acquiring first instances based on the entity pairs, and
   eliminating instances that do not have the semantic relationships from the first instances to obtain second instances,
   wherein r is a positive integer, each of the entity pairs contains a pair of named entities, and the first instances are sentences containing the entity pairs;
   wherein eliminating the instances that do not have the semantic relationships from the first instances to obtain the second instances comprises:
   extracting first features from each of the first instances based on the entity pairs to construct a first instance-feature matrix $M_{nf}$, and
   constructing a semantic relationship-first instance matrix $M_{rn}$,
   wherein the first features comprise lexical features and/or syntactic features, n is a number of the first instances, and f is a total number of all the first features; and
   wherein eliminating the instances that do not have the semantic relationships from the first instances to obtain the second instances further comprises:
   obtaining a semantic relationship-feature matrix $M_{rf}$, wherein $M_{rf}=M_{rn}*M_{nf}$,
   decomposing the semantic relationship-feature matrix $M_{rf}$ into $M_{rk}*M_{kf}$ by a nonnegative matrix factorization method,
   obtaining $M_{nk}$ by multiplying $M_{nf}$ by $M_{kf}^T$,
   obtaining similarity between each of the first instances and all the semantic relationships respectively based on $M_{nk}$ and $M_{rk}^T$, and
   screening out the second instances from the first instances based on the similarity,
   wherein $M_{rk}$ is a representation matrix of the semantic relationships in a latent semantic space and $M_{nk}$ is a representation matrix of the first instances in the latent semantic space.

2. The information extracting method according to claim 1, wherein acquiring the entity pairs corresponding to the semantic relationships and acquiring the first instances based on the entity pairs comprises:
   acquiring the entity pairs corresponding to the semantic relationships from a knowledge base;
   tagging sentences that contain the named entities of all the entity pairs in a database using a named entity recognition tool; and
   retrieving the first instances containing the entity pairs from the tagged sentences.

3. The information extracting method according to claim 1, wherein obtaining the similarity between each of the first instances and all the semantic relationships respectively based on $M_{nk}$ and $M_{rk}^T$ comprises:
  obtaining the similarity between each of the first instances and all the semantic relationships respectively through cosine similarity based on $M_{nk}$ and $M_{rk}^T$.

4. The information extracting method according to claim 1, wherein screening out the second instances from the first instances based on the similarity comprises:
  normalizing the similarity so that a sum of the normalized similarity of each of the first instances with all of the semantic relationships respectively is 1,
  obtaining an information entropy of each of the first instances based on the normalized similarity of each of the first instances with all of the semantic relationships respectively, and
  selecting the first instances whose information entropy is less than a predetermined threshold as the second instances.

5. The information extracting method according to claim 1, further comprising:
  extracting second features from the second instances based on the entity pairs to train a classifier,
  wherein the second features comprise lexical features and/or syntactic features.

6. The information extracting method according to claim 5, further comprising:
  identifying semantic relationships from text sentences and classifying the text sentences based on the semantic relationships using the classifier.

7. The information extracting method according to claim 6, wherein identifying the semantic relationships from the text sentences and classifying the text sentences using the classifier comprises:
  using the named entity recognition tool to tag sentences that contain the named entities in a database,
  retrieving text sentences containing the entity pairs from the tagged sentences, and
  identifying semantic relationships of the entity pairs in the text sentences according to the classifier, and
  classifying the text sentences based on the semantic relationships according to the classifier.

8. The information extracting method according to claim 1, wherein
  the lexical features include at least one selected from the group consisting of entity pair's position in a sentence, word sequence between the entity pairs, characteristic sequence between the entity pairs, left window of size X of the entity pair, and right window of size X of the entity pair, wherein X≥0, and
  the syntax features include at least one selected from the group consisting of the shortest dependency path between the entity pairs, left window of size Y of the entity pair, and right window of size Y of the entity pair, wherein Y≥0.

* * * * *